W. C. PEIRCE.

Improvement in Pastry-Rollers.

No. 132,736.  
Patented Nov. 5, 1872.

WITNESSES:  
Benj Morison  
Wm H. Morison

INVENTOR:  
William C. Peirce

UNITED STATES PATENT OFFICE.

WILLIAM C. PEIRCE, OF PHILADELPHIA, PENNSYLVANIA.

IMPROVEMENT IN PASTRY-ROLLERS.

Specification forming part of Letters Patent No. 132,736, dated November 5, 1872.

*To all whom it may concern:*

Be it known that I, WILLIAM C. PEIRCE, of the city of Philadelphia, in the State of Pennsylvania, have invented certain Improvements in Pastry-Rollers, of which the following is a specification:

My invention relates to the combination of two comparatively short rollers of wood or other suitable material with a cast-metal frame and handle in one piece of metal, in such a manner that the said implement can be used in one hand by the person operating it in rolling out pastry-dough; the object of my invention being to enable the operator to roll the implement in any horizontal direction over the dough as the extension of the latter may require, and thus to entirely avoid the necessity of lifting or turning the flattened dough around upon the table or stand for the purpose, as heretofore.

Figure 1:
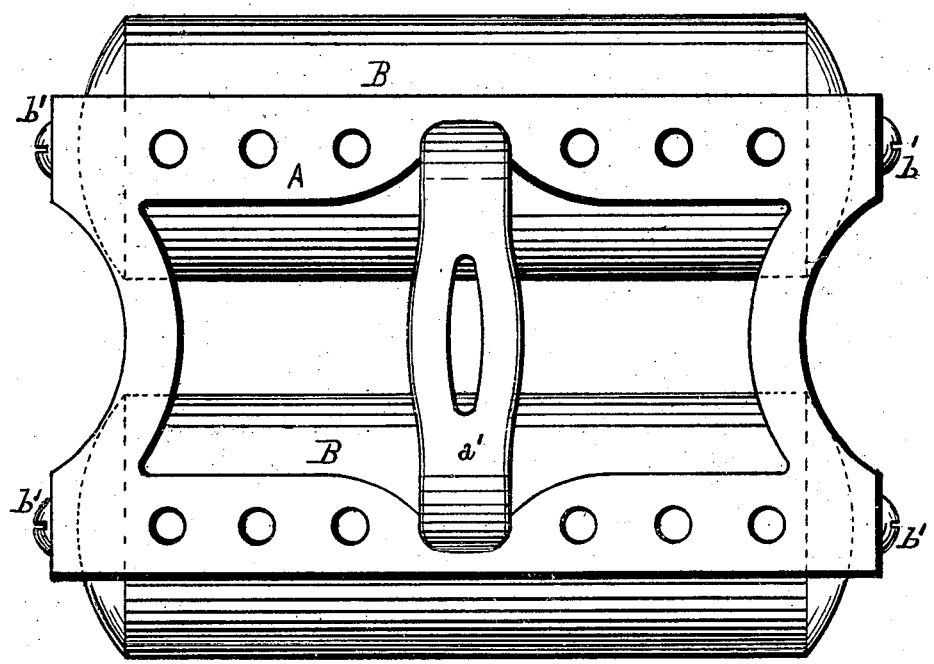
Figure 2:
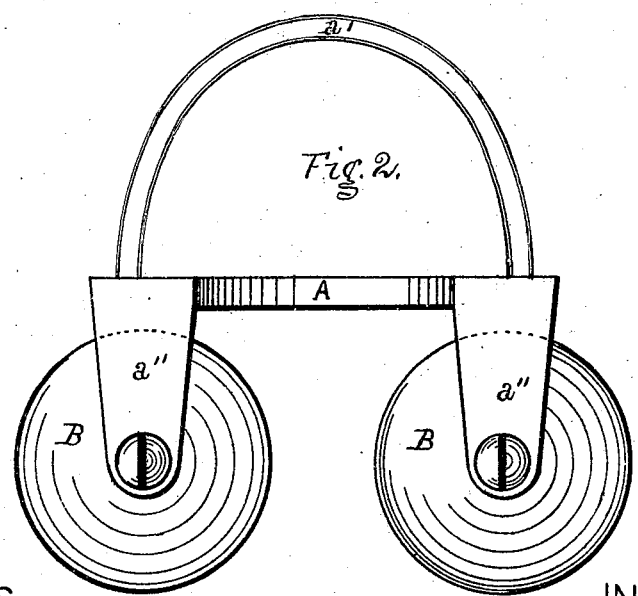

Figure 1 is a plan view of my said improved roller. Fig. 2 is an end view of the same.

The metal frame A, for a full-sized roller, should be not more than six inches in length and three and a half inches in width, and in the form of an open or skeleton frame, with an arched or raised handle, $a'$, spanning across the middle of the upper side, and four downward-projecting legs, $a''$ $a''$ $a''$ $a''$, each about an inch and three-eighths long, with bearing-holes across through their lower ends for the reception of the journals of the rollers B B. The whole frame with its handle $a'$ and legs $a''$ is cast in one piece and made as light as the required strength for the purpose will permit, substantially as represented in the drawing. The two rollers B B are intended to be made of hard wood. They are cylinders of equal diameters—say about two inches—with convex ends, and fit easily in between the respective legs $a''$ $a''$ of the frame A, with their journals $b'$ $b'$ in the respective holes in the lower ends of the said legs. The journals $b'$ $b'$ are convex-headed wood-screws entered into the ends of the rollers B B through the holes in the legs $a''$ $a''$ of the frame, and allow the said rollers, which are parallel to each other, to rotate freely as the implement is used.

It will be seen, without further explanation, that this pastry-roller can be readily used in one hand for rolling over the dough in any direction that it may require, and thus enable the operator to complete the flattening of the latter in a perfect manner without changing the position of the said dough upon the table. It is light and easy to handle in one hand, costs no more than the long double rollers of wood now in the market, and is not liable to get out of order when wet.

I claim as my invention—

The pastry-roller described, consisting of the metal frame A and the rollers B B, of wood or other suitable material, the said parts being constructed and combined together substantially in the manner and for the purposes hereinbefore set forth.

WILLIAM C. PEIRCE.

Witnesses:
BENJ. MORISON,
WM. H. MORISON.